United States Patent
Martz et al.

(10) Patent No.: US 6,228,971 B1
(45) Date of Patent: May 8, 2001

(54) POLYMERIC IMINE FUNCTIONAL COMPOSITIONS AND THEIR USE IN FILM-FORMING COMPOSITIONS

(75) Inventors: Jonathan T. Martz, Glenshaw; Joseph M. Carney, Gibsonia; Robert E. Jennings, Ellwood City, all of PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 09/337,606

(22) Filed: Jun. 21, 1999

(51) Int. Cl.[7] .......................... C08G 73/02; C08G 63/48; G08F 8/30; C08L 75/30

(52) U.S. Cl. .......................... 528/127; 528/61; 526/217; 526/310; 526/324; 525/63; 525/64; 525/66; 525/111; 525/123; 525/330.5; 525/421; 525/438; 525/452; 525/471; 525/528; 525/530; 525/531; 525/902; 524/504; 524/555

(58) Field of Search ................ 528/127, 61; 526/310, 526/324, 217; 524/555, 504; 525/64, 66, 63, 902, 123, 438, 111, 528, 452, 471, 330.5, 421, 531, 530

(56) References Cited

U.S. PATENT DOCUMENTS

| | | | |
|---|---|---|---|
| 4,348,506 | * 9/1982 | Ganguli et al | 525/512 |
| 4,910,249 | * 3/1990 | Kania et al. | 524/555 |
| 4,927,969 | 5/1990 | Kahle, II et al. | 564/377 |
| 4,990,577 | * 2/1991 | Noomen et al. | 525/454 |
| 5,011,994 | * 4/1991 | Bartels et al. | 564/278 |
| 5,077,360 | * 12/1991 | De Pompei et al. | 525/418 |
| 5,312,962 | 5/1994 | Schafer et al. | 560/121 |
| 5,444,117 | 8/1995 | Wade et al. | 524/590 |
| 5,459,204 | 10/1995 | Lomoelder et al. | 525/409 |
| 5,466,771 | 11/1995 | Hicks et al. | 528/64 |
| 5,523,376 | 6/1996 | Hicks et al. | 528/44 |
| 5,629,403 | 5/1997 | Hicks et al. | 528/48 |
| 5,661,216 | * 8/1997 | Laginess et al. | 524/871 |
| 5,712,363 | * 1/1998 | Noomen et al. | 528/229 |
| 5,763,546 | * 6/1998 | Jung et al. | 525/313 |
| 5,859,136 | * 1/1999 | Scopazzi et al. | 525/123 |
| 5,880,180 | * 3/1999 | Smith | 523/508 |
| 5,886,225 | * 3/1999 | Jalett et al. | 564/415 |
| 5,955,199 | * 9/1999 | Johnson et al. | 428/423.1 |
| 5,977,246 | * 11/1999 | Fenn | 524/590 |
| 5,990,243 | * 12/1999 | Mormile et al. | 525/111 |
| 6,008,410 | * 12/1999 | Olli | 564/57 |
| 6,077,929 | * 6/2000 | Pardoen et al. | 528/220 |
| 6,090,881 | * 7/2000 | Das et al. | 524/555 |
| 6,103,849 | * 8/2000 | Squiller et al. | 528/45 |

FOREIGN PATENT DOCUMENTS

0340976 A2   11/1989   (EP) .

OTHER PUBLICATIONS

"Aldimine–Isocyanate Chemistry: A Foundation for High Solids Coatings" by S.M. Lee, et al., *Waterborne, Higher–Solids, and Powder Coatings Symposium* (Feb. 1995) pp 69–77.

"Aldimine–Isocyanate Chemistry: Application in High Solids Coatings" by M.J. Dvorchak, et al., *Waterborne, Higher–Solids, and Powder Coatings Symposium* (Feb. 1995) 78–87.

"Amine Chemistries for Isocyanate–Based Coatings" by Douglas A. Wicks, et al., *Progress in Organic Coatings* 30 (1997) pp 265–270.

\* cited by examiner

*Primary Examiner*—P. Hampton-Hightower
(74) *Attorney, Agent, or Firm*—William J. Uhl

(57) ABSTRACT

Novel imine functional copolymers are provided containing a plurality of groups of the structure:

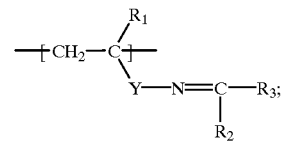

where $R_1$ is hydrogen or methyl; $R_2$ is hydrogen or an alkyl group having from about 1 to about 10 carbon atoms; $R_3$ is an alkyl or aryl group having from about 1 to about 10 carbon atoms, or $R_3$ is bonded to $R_2$ and forms part of a five- or six-membered ring; and Y is a divalent linking group having from about 3 to about 15 carbon atoms. The composition is useful in film-forming compositions curable at ambient temperature and above.

23 Claims, No Drawings

POLYMERIC IMINE FUNCTIONAL COMPOSITIONS AND THEIR USE IN FILM-FORMING COMPOSITIONS

FIELD OF THE INVENTION

The present invention relates to polymeric aldimine and ketimine functional compositions and their use in curable film-forming compositions.

BACKGROUND OF THE INVENTION

Curable film-forming compositions (coatings) have been used in automotive and other industrial manufacturing for decades. Curable compositions (as opposed to lacquers) offer better protection to substrates because of their abilities to resist damage by solvents, acids, and other chemicals, and effects of weathering. Depending on the cure chemistry, some compositions are curable at ambient temperature; others require heating to effect cure.

A variety of curing agents having different types of functional groups (and hence different chemistries) may be utilized in curable film-forming compositions. Examples of curing agents which are suitable for use in compositions that are curable at ambient temperatures include, inter alia, polyanhydrides, polyisocyanates, and polyepoxides. Each type of curing agent contains different chemical functional groups, providing unique properties to a cured composition.

Coating compositions having superior durability, hardness, chemical resistance, and similar properties are sought after in virtually all industries that use coatings.

It would be desirable to provide compositions that may be cured at ambient or higher temperatures with a variety of curing agents, providing film-forming compositions that exhibit excellent properties.

SUMMARY OF THE INVENTION

In accordance with the present invention, an addition copolymer having imine functional groups is provided containing a plurality of groups of the structure:

 (I)

wherein A is

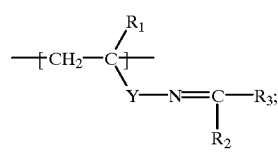 (II)

$R_1$ is hydrogen or methyl; $R_2$ is hydrogen or an alkyl group having from about 1 to about 10 carbon atoms; $R_3$ is an alkyl or aryl group having from about 1 to about 10 carbon atoms, or $R_3$ is bonded to $R_2$ and forms part of a five- or six-membered ring; Y is a divalent linking group having from about 3 to about 15 carbon atoms; B is the residue of an ethylenically unsaturated monomer or mixture of monomers copolymerized with and different from A; x is about 10 to about 50 percent by weight; and m is about 50 to about 90 percent by weight; based on the total solid weight of monomers used to prepare the copolymer. Also provided are curable film-forming compositions comprising the copolymer described above and a curing agent having functional groups that are reactive with imine groups.

DETAILED DESCRIPTION

The imine functional addition copolymer of the present invention contains a plurality of groups of the structure:

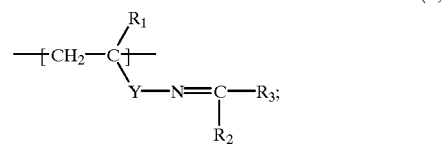 (II)

wherein $R_1$ is hydrogen or methyl; $R_2$ is hydrogen or an alkyl group having from about 1 to about 10 carbon atoms; $R_3$ is an alkyl or aryl group having from about 1 to about 10 carbon atoms, or $R_3$ is bonded to $R_2$ and forms part of a five- or six-membered ring; and Y is a divalent linking group having from about 3 to about 15 carbon atoms. The alkyl groups of $R_2$ and $R_3$ may independently be linear, branched, or cyclic. Examples of alkyl groups include methyl, ethyl, isobutyl, isopropyl, n-propyl, n-butyl, hexyl, cyclohexyl, methylethyl, octyl, and the like. Aryl groups include, inter alia, phenyl, benzyl, and mono- or polysubstituted derivatives thereof.

It is understood that the groups of structure (II) may be in equilibrium with isomers such as enamines, having the structure:

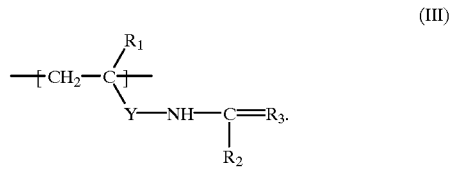 (III)

The divalent linking group Y may have from about 3 to about 15 carbon atoms and may be alkyl or aryl, including alkaryl and aralkyl, and may be linear, cyclic, or branched. The linking group may additionally include functional groups such as, for example, ester, ether, urethane, etc.

In a preferred embodiment of the invention, Y has the structure:

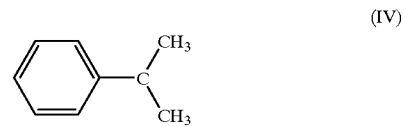 (IV)

wherein the aromatic ring is bonded to the backbone carbon of the copolymer in the meta position. In this embodiment, $R_2$ is typically hydrogen such that the imine group of structure (II) is an aldimine.

The divalent linking group Y may also have the structure:

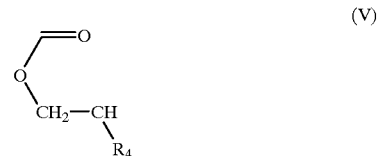 (V)

and $R_4$ is hydrogen or an alkyl group having from about 1 to about 10 carbon atoms. The alkyl group of $R_4$ may be linear, branched, or cyclic. Examples of alkyl groups include methyl, ethyl, isobutyl, isopropyl, n-butyl, hexyl, octyl, and the like. In this embodiment, the imine group of structure (II) is an ester of acrylic or methacrylic acid.

The imine functional addition copolymer of the present invention may be prepared using conventional free radical polymerization techniques. The copolymer may be prepared by reacting together the following:

1) an ethylenically unsaturated material having the structure:

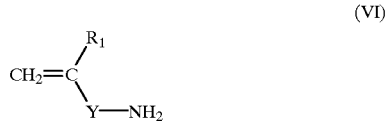

(VI)

wherein $R_1$ and Y are as defined above;

2) at least one other ethylenically unsaturated monomer; and 3) an aldehyde or ketone.

The material of 1) may be any ethylenically unsaturated amino functional monomer. A preferred example is dimethyl-eta-isopropenyl benzyl amine.

The ethylenically unsaturated monomer of 2) may be selected from acrylic and vinyl monomers. The acrylic monomers include alkyl esters of acrylic acid or methacrylic acid, wherein the alkyl group may contain from about 1 to about 12 carbon atoms. Suitable alkyl esters of acrylic acid or methacrylic acid include methyl methacrylate, ethyl methacrylate, butyl methacrylate, ethyl acrylate, butyl acrylate, 2-ethyl hexyl acrylate, cyclohexyl methacrylate, isobornyl methacrylate, isobutyl methacrylate, lauryl methacrylate, and the like. Suitable other copolymerizable ethylenically unsaturated monomers include vinyl aromatic compounds such as styrene, alpha-methyl styrene, and vinyl toluene; vinyl and vinylidene halides such as vinyl chloride and vinylidene fluoride and vinyl esters such as vinyl acetate. Mixtures of ethylenically unsaturated monomers may be used.

The ethylenically unsaturated monomer of 2) is most often selected from the group consisting of styrene, butyl acrylate, alpha-methyl styrene, isobornyl methacrylate, and mixtures thereof.

The aldehyde or ketone of 3) may have from about 2 to about 10 carbon atoms, and is typically selected from the group consisting of isobutyraldehyde, acetaldehyde, benzaldehyde, trimethylacetaldehyde, methylethyl ketone, diisopropyl ketone, methylisobutyl ketone, and acetone. Mixtures of aldehydes and/or ketones may also be used.

In forming the composition of the present invention, the material of 1) may be polymerized with the ethylenically unsaturated monomer(s) of 2) using solution polymerization techniques in the presence of suitable initiators such as organic peroxides or azo compounds, for example, benzoyl peroxide or N,N-azobis(isobutyronitrile). The polymerization may be carried out in an organic solution in which the monomers are soluble by techniques conventional in the art.

After polymerization, the resultant amine functional copolymer may be reacted with the aldehyde or ketone of 3) to form an imine functional copolymer. Alternatively, the ethylenically unsaturated material of 1) and the aldehyde or ketone of 3) may be reacted together first to form an aldimine- or ketimine-functional monomer, followed by polymerization with the ethylenically unsaturated monomer(s) of 2). In this alternative embodiment, which is preferred, no solvents are required but may be present. The reaction conditions to form aldimines and ketimines is dependent on the structures of the amine, aldehyde and ketone. For example, a more sterically hindered amine will react more slowly and require heat to react with an aldehyde or ketone. The reaction conditions at which a primary amine will react with an aldehyde is ambient temperature to about 80° C. The equilibrium favors aldimine formation. Water is removed during or after aldimine synthesis using an appropriate dehydrating solvent that forms an azeotrope with water. Water can also be removed by an appropriate dehydrating agent, for example, molecular sieves. Water can be removed after aldimine formation by reduced pressure. With ketimine formation, the reaction requires the removal of water to force the reaction to completion. Temperatures required for the reaction range from about 60° C. to about 140° C., accompanied by the use of a solvent that will azeotrope with water and dry the reaction. For example, methyl isobutyl ketone (boiling point=119° C.) can be used both as a reactant and azeotrope solvent. Dehydrating agents could be stirred with the amine and ketone to force the equilibrium toward ketimine formation. Catalysts may be needed to facilitate ketimine formation. These include acid catalysts, such as acetic acid or p-toluenesulfonic acid.

The aldimine- or ketimine-functional monomer (repeat unit of structure II) is typically present in the copolymer in an amount of about 10 to about 50, preferably about 20 to about 40 percent by weight, based on the total solid weight of monomers used to prepare the copolymer.

In an alternative technique, the imine functional addition copolymer of the present invention may be prepared by reacting together:

1) an ethylenically unsaturated acid functional material;

2) at least one other ethylenically unsaturated monomer such as those disclosed above;

3) an imine; and 4) an aldehyde or ketone such as those disclosed above.

In this technique, the ethylenically unsaturated acid functional material of 1) which may be selected from acrylic acid, methacrylic acid, crotonic acid, fumaric acid, itaconic acid, maleic anhydride, and the like, is polymerized with the ethylenically unsaturated monomer(s) of 2) as above. After polymerization, the resultant acid functional copolymer is reacted with the imine of 3) which may be selected from ethylene imine, propylene imine, and the like, to yield an amine functional copolymer, which may be further reacted with the aldehyde or ketone of 4) to form an imine functional copolymer.

The imine functional compositions of the present invention may be combined with curing agents having functional groups that are reactive with imines, to form curable film-forming compositions for use in automotive applications and in other applications requiring the use of curable film-forming compositions. The imine functional composition is present in the film-forming composition in an amount of about 30 to about 90 percent by weight, preferably about 50 to about 80 percent by weight, based on the total weight of resin solids in the film-forming composition. The curing agent is present in the film-forming composition in an amount of about 10 to about 70 percent by weight, preferably about 20 to about 50 percent by weight.

Materials suitable for use as curing agents in the curable film-forming compositions of the present invention, having functional groups that are reactive with imines include polyisocyanates, polyanhydrides, polycarbonates, polyepoxides, polyacrylates, and mixtures thereof. Polyisocyanates containing free or blocked isocyanate groups may be used. Typically, when polyisocyanates containing free isocyanate groups are used, the film-forming composition is a two-package composition and is curable at ambient temperature.

Examples of polyisocyanates and blocked polyisocyanates which may be used in the curable film-forming composition of the present invention include those described in U.S. Pat. No. 4,546,045 at column 5, lines 16–38, and in U.S. Pat. No. 5,468,802 at column 3, lines 48–60, both hereby incorporated by reference.

Suitable polyanhydrides include addition polymers and oligomers typically used in film-forming compositions such as acrylic and vinyl polymers.

Examples of polyanhydrides suitable for use as curing agents in the curable compositions of the present invention include those described in U.S. Pat. No. 4,798,746 at column 10, lines 16–50; and in U.S. Pat. No. 4,732,790 at column 3, lines 41–57, both hereby incorporated by reference.

Examples of polycarbonate curing agents are the addition products of polyepoxide compounds and carbon dioxide. Polyepoxide compounds include those derived from glycidol, glycidyl ethers, glycidyl esters and cycloaliphatic epoxies, which react with carbon dioxide as follows to form carbonate functional groups:

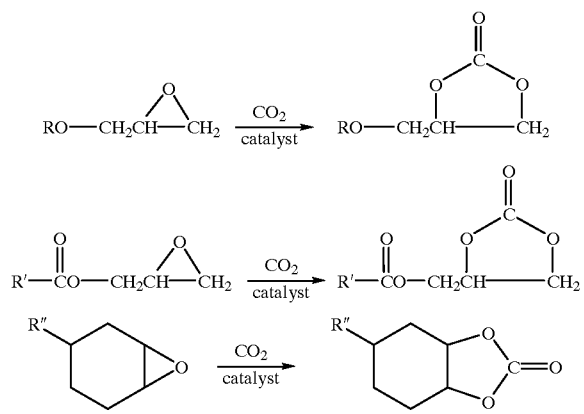

wherein R may be hydrogen, aromatic, aliphatic, or cycloaliphatic; and R' and R" are independently aromatic, aliphatic, or cycloaliphatic.

Derivatives of glycidyl ethers would include acrylic polymers or oligomers containing allyl glycidyl ether and the reaction product of a polyfunctional alcohol with epichlorohydrin. Polyfunctional alcohols include trimethylolpropane, 1,6-hexanediol and Bisphenol A. Derivatives of glycidyl esters include acrylic polymers containing glycidyl methacrylate and products from acid functional polyesters (for example, trimethylolpropane reacted with 3 moles of hexahydrophthalic anhydride) and epichlorohydrin. Derivatives of cycloaliphatic epoxies include ERL-4221 and ERL-4289 available from Union Carbide. Glycidol can be reacted with carbon dioxide to form glycerol carbonate. Subsequent reaction with polyisocyanates form urethane polycarbonates.

Examples of polyepoxides suitable for use as curing agents in the curable compositions of the present invention include those described in U.S. Pat. No. 4,681,811 at column 5, lines 33–58, hereby incorporated by reference. It is preferred that the film-forming composition be cured at an elevated temperature when polyepoxides are used as the curing agents.

Examples of polyacrylates suitable for use as curing agents in the curable compositions include those described in U.S. Pat. No. 3,975,251, column 3 at lines 1–59, hereby incorporated by reference.

Catalysts that are suitable for use in the film-forming composition of the present invention include inter alia, conventional transesterification catalysts including ammonium compounds such as benzyltrimethyl ammonium hydroxide, organotin compounds such as dibutyltin dilaurate and di- or trialkyltin oxides, titanium complexes such as butyl titanate or triethanolamine titanate, ferric acetylacetonate, zinc acetate, lead octoate, and the like. The choice of specific catalysts depends on the functionality of the materials in the film-forming composition.

The catalyst is present in the film-forming composition at an amount of about 0.1 to about 5 percent, preferably about 1 to about 2 percent by weight, based on the total weight of resin solids in the film-forming composition.

Optional ingredients such as, for example, plasticizers, surfactants, thixotropic agents, anti-gassing agents, organic cosolvents, flow controllers, anti-oxidants, UV light absorbers and similar additives conventional in the art may be included in the composition. These ingredients are typically present at up to 40% by weight based on the total weight of resin solids.

The film-forming compositions of the present invention are typically solventborne. Suitable solvent carriers include the various alcohols, esters, ethers, aromatic solvents, and other solvents, including mixtures thereof, that are known in the art of coating formulation. The film-forming compositions typically have a total solids content of about 40 to about 60 percent by weight.

The film-forming composition of the present invention may contain color pigments conventionally used in surface coatings and may be used as a base coat or high gloss monocoat; that is, a high gloss pigmented coating. By "high gloss" it is meant that the cured coating has a 20° gloss and/or a DOI ("distinctness of image") measurement of at least about 80 as measured by standard techniques known to those skilled in the art. Such standard techniques include ASTM D523 for gloss measurement and ASTM E430 for DOI measurement.

Color pigments conventionally used in surface coatings are suitable and include, for example, inorganic pigments such as titanium dioxide, iron oxides, chromium oxide, lead chromate, and carbon black, and organic pigments such as phthalocyanine blue and phthalocyanine green. Mixtures of the above mentioned pigments may also be used. Suitable metallic pigments include in particular aluminum flake, copper bronze flake and metal oxide coated mica, nickel flakes, tin flakes, and mixtures thereof.

When present, the pigment is incorporated into the coating composition in amounts of about 1 to about 80 percent by weight based on the total weight of coating solids. The metallic pigment is employed in amounts of about 0.5 to about 25 percent by weight based on the total weight of coating solids.

The film-forming compositions can be applied to various substrates to which they adhere including wood, metals, glass, and plastic.

The film-forming composition of the present invention is typically used as a clear coat applied alone to a substrate or on top of a colored base coat as part of a multi-component composite coating composition (such as a color-plus-clear system.) The film-forming composition of the base coat in the color-plus-clear system can be any of the compositions useful in coatings applications, particularly automotive applications. The film-forming composition of the base coat comprises a resinous binder and a pigment to act as the colorant. Particularly useful resinous binders are acrylic polymers, polyesters, including alkyds, and polyurethanes.

The resinous binders for the base coat can be organic solvent-based materials such as those described in U.S. Pat. No. 4,220,679, note column 2 line 24 continuing through column 4, line 40. Also, water-based coating compositions such as those described in U.S. Pat. No. 4,403,003, U.S. Pat. No. 4,147,679 and U.S. Pat. No. 5,071,904 can be used as the binder in the base coat composition. Suitable base coat compositions that are curable at room temperature include those described in U.S. Pat. Nos. 4,798,745 and 4,798,746.

The base coat composition contains pigments to give it color. Suitable metallic pigments include aluminum flake, copper bronze flake and metal oxide coated mica.

Besides the metallic pigments, the base coat compositions may contain non-metallic color pigments conventionally used in surface coatings including inorganic pigments such as titanium dioxide, iron oxide, chromium oxide, lead chromate, and carbon black, and organic pigments such as phthalocyanine blue and phthalocyanine green.

Optional ingredients in the base coat composition are those which are well known in the art of formulating surface coatings and include surfactants, flow control agents, thixotropic agents, fillers, anti-gassing agents, organic co-solvents, catalysts, and other customary auxiliaries. Examples of these materials and suitable amounts are described in U.S. Pat. Nos. 4,220,679, 4,403,003, 4,147,769 and 5,071,904.

The base coat compositions can be applied to the substrate by any conventional coating technique such as brushing, spraying, dipping or flowing, but they are most often applied by spraying. The usual spray techniques and equipment for air spraying, airless spray and electrostatic spraying in either manual or automatic methods can be used.

During application of the base coat to the substrate, a film of the base coat is formed on the substrate typically in a thickness of about 0.1 to about 5 mils (about 2.54 to about 127 microns), preferably about 0.1 to about 2 mils (about 2.54 to about 50.4 microns).

After forming a film of the base coat on the substrate, the base coat can be cured or alternately given a drying step in which solvent is driven out of the base coat film by heating or an air drying period before application of the clear coat. Suitable drying conditions will depend on the particular base coat composition, and on the ambient humidity if the composition is waterborne, but in general, a drying time of from about 1 to 15 minutes at a temperature of about 75 to 200° F. (21 to 93° C.) will be adequate.

The clear topcoat composition is typically applied to the base coat by spray application. As mentioned above, the clear topcoat can be applied to a cured base coat or to a dried base coat before the base coat has been cured. In the latter instance, the two coatings are cured simultaneously. After application of the clear coat composition to the base coat, the coated substrate is allowed to cure at ambient temperature. The coated substrate may also be heated as desired, often up to about 93° C. (200° F.). In the curing operation, solvents are driven off and the film-forming materials of the clear coat and the base coat are each crosslinked. When a capped polyisocyanate curing agent is used, the curing operation is usually carried out at a temperature in the range of from 265 to 300° F. (129 to 149° C.) for 20 to 30 minutes. The clear coating thickness (dry film thickness) is typically about 1 to about 6 mils (about 25.4 to about 152.4 microns).

The invention will be further described by reference to the following examples. Unless otherwise indicated, all parts are by weight.

EXAMPLE A

This example illustrates the synthesis of an ethylenically unsaturated, aldimine functional monomer.

A reaction vessel equipped with stirrer, thermocouple, condenser and addition funnel was charged with 1172.5 g meta-isopropenyl-a,a-dimethylbenzylamine (6.70 equivalents) and heated to 60° C. Then 579.7 g isobutyraldehyde (8.04 equivalents, available from ACROS Organics) was added over 30 minutes. When the addition was complete, 200.0 g cyclohexane and added to the flask contents and the resulting mixture heated to 90° C. to azeotrope water from the reaction mixture. After 110.7 g water were removed (91.8% of theory), 40 mm Hg of vacuum was applied to distill off cyclohexane and water. Analysis of the product by quantitative $^{13}$C NMR showed 93.5% conversion to the aldimine. Another 39.0 g isobutyraldehyde (0.54 equivalents) was added to the reaction mixture, the vessel contents heated to 70° C. and stirred for another 4 hours. After this time, vacuum was again applied to remove water and excess isobutyraldehyde to afford a aldimine monomer of 96.2% purity (as determined by quantitative $^{13}$C NMR).

EXAMPLE B

This example illustrates the synthesis of an aldimine functional polymer using the monomer from Example A.

A reaction vessel equipped with stirrer, thermocouple, condenser and addition funnel was charged with 58.7 g n-hexyl acetate (available from Exxon Chemical) and heated to reflux (about 160° C.) under nitrogen. A monomer and initiator feed consisting of 88.0 g styrene, 176.0 g butyl acrylate, 176.0 g aldimine monomer of Example A and 44.0 g di-t-amyl peroxide (available from Atochem) was added over 2 hours to the reaction vessel. After the addition of the feed was complete, the contents of the vessel were allowed to reflux for 30 minutes and 7.3 g di-t-amyl peroxide was added over 30 minutes. Reaction contents were allow to reflux another hour and then allowed to cool.

The resultant product had a total solids content of 81.1% measured for 1 hour at 110° C.; had residual contents of styrene and butyl acrylate of 0.05% and 0.09%, respectively; had a Gardner-Holdt bubble tube viscosity of >Z6; had an APHA color of 100–150; had a weight average molecular weight of 11433; and had a number average molecular weight of 2976. The theoretical amine equivalent weight was 716 gram/equivalent.

EXAMPLE C

This example illustrates the synthesis of a polymer having both aldimine and hydroxyl functionality using the monomer from Example A.

A reaction vessel equipped with stirrer, thermocouple, condenser and addition funnel was charged with 72.0 g n-hexyl acetate and heated to reflux (about 165° C.) under nitrogen. A monomer and initiator feed consisting of 80.0 g styrene, 80.0 g butyl methacrylate, 20.0 g butyl acrylate, 80.0 g isobornyl methacrylate, 20.0 g hydroxyethyl acrylate, 120.0 g aldimine monomer of Example A, and 24.0 g di-t-amyl peroxide (available from Atochem) was added over 2 hours to the reaction vessel. After the addition of the feed was complete, the contents of the vessel were allowed to reflux for 30 minutes and 4.0 g di-t-amyl peroxide was added over 30 minutes. Reaction contents were allow to reflux another hour and then allowed to cool.

The resultant product had a total solids content of 78.4% measured for 1 hour at 110° C.; had residual contents of styrene, butyl methacrylate, butyl acrylate and isobornyl methacrylate of 0.02%, 0.19%, 0.09%, 0.53, respectively; had a Gardner-Holdt bubble tube viscosity of >Z6; had an APHA color of 100–150; had a weight average molecular weight of 4378; and had a number average molecular weight of 3644. The theoretical amine equivalent weight was 955 gram/equivalent.

EXAMPLE D

This example illustrates the synthesis of an aldimine functional polymer by preparing a primary amine functional resin followed by reaction with isobutyraldehyde.

A reaction vessel equipped with stirrer, thermocouple, condenser and addition funnel was charged with 161.0 g n-hexyl acetate (available from Exxon Chemical) and heated to reflux (about 164° C.) under nitrogen. A monomer and initiator feed consisting of 228.0 g styrene, 456.3 g butyl acrylate, 68.3 g butyl methacrylate, 166.9 g methacrylic acid and 55.0 g di-t-amyl peroxide (available from Atochem) was added over 2 hours to the reaction vessel. After the addition of the feed was complete, the contents of the vessel were allowed to reflux for 30 minutes and a feed consisting of 9.2 g di-t-amyl peroxide and 9.2 g n-hexyl acetate was added over 30 minutes. Reaction contents were allow to reflux another hour and then allowed to cool.

The resultant product had a total solids content of 79.7% (measured for 1 hour at 110° C.); a residual content of butyl methacrylate of 2.35%; a Gardner-Holdt bubble tube viscosity of >Z6; a weight average molecular weight of 7857; a number average molecular weight of 3405; and an acid value of 84.3 mg KOH/g.

In a reaction vessel equipped with stirrer, thermocouple, condenser and addition funnel was charged 500.0 g of the above acid functional acrylic resin and 164.2 g toluene and heated to 60° C. A charge of 41.7 g propylene imine was added by syringe over 18 minutes while maintaining the temperature less than 65° C. The reaction contents were monitored by acid value and meq amine until the results indicated 83% of the acid had been reacted. An infrared spectrum of the reaction contents was taken. Isobutyraldehyde (52.8 g) was added to the reaction mixture. An infrared spectrum of the reaction contents revealed the appearance of a peak at 1668 cm−1, indicative of C=N stretch and of aldimine formation. Condensation of water was also observed on the flask walls. The reaction was monitored by infrared until no further change in the C=N stretch was observed. Water and toluene (46 g) were then removed by vacuum distillation.

The resultant product had a total solids content of 67.5% (measured for 1 hour at 110° C.); a Gardner-Holdt bubble tube viscosity of Z5–Z6; a weight average molecular weight of 9456; an acid value of 13.6 mg KOH/g; a residual propylene imine content of 36 ppm; an acid value of 13.6 mg KOH/g; and an amine content of 0.61 meq amine/g. Carbon 13 NMR spectrum of the reaction product had a resonance at 170 ppm indicative of presence of aldimine.

EXAMPLES 1 TO 4

The following examples illustrate the preparation of curable film-forming compositions according to the present invention. Examples 1 to 3 are compositions containing aldimine functional copolymers and various curing agents. Example 4 is a composition containing an aldimine and hydroxyl functional copolymer, and a polyisocyanate curing agent.

| | Example | | | |
|---|---|---|---|---|
| | 1 | 2 | 3 | 4 |
| Package 1 | | | | |
| Aldimine functional polymer of Example B | 42.226 | 31.281 | 52.857 | — |
| Aldimine-hydroxyl functional polymer of Example C | — | — | — | 49.5 |
| TINUVIN 324[1] | — | — | — | 1.4 |
| TINUVIN 384[2] | 1.095 | 1.146 | 1.382 | — |
| BYK 306[3] | 0.131 | 0.138 | 0.166 | 0.2 |
| TINUVIN 292[4] | 0.788 | 0.825 | 0.995 | 1.0 |
| DT 870[5] | 42.226 | 15.641 | — | — |
| Butyl acetate | — | — | 7.996 | 7.6 |
| Methyl isobutyl ketone | — | — | 8.963 | 8.7 |
| Methyl amyl ketone | — | — | 15.001 | 14.5 |
| Sub Total | 86.466 | 49.031 | 87.360 | 82.9 |
| Package 2 | | | | |
| DCX-61[6] | 13.534 | — | — | 17.2 |
| DC 1375[7] | — | 50.969 | — | — |
| ERYSIS GE-60[8] | — | — | 12.640 | — |
| Total | 100.000 | 100.000 | 100.000 | 100.100 |

[1]Benzotriazole derivative, 95% in xylene, available from Ciba-Geigy Corp.
[2]UV absorber available from Ciba-Geigy Corp.
[3]Rheological additive available from BYK-Chemie USA.
[4]Bis(1,2,2,6,6-pentamethyl-4-piperidinyl) sebacate hindered amine stabilizer available from Ciba-Geigy Corp.
[5]Solvent package available from PPG Industries, Inc.
[6]Polyisocyanate curing agent available from PPG Industries, Inc., consisting of a 50/50 blend of an isocyanurate of IPDI (IT-1072 available from Olin Chemicals, USA) and HMDI dimer/trimer (HDT-LV available from Rhone Poulenc).
[7]Polyanhydride curing agent available from PPG Industries, Inc.
[8]Polyepoxide resin available from CVC Specialty Chemicals, Inc.

Each of the coating compositions of Examples 1 to 4 was prepared in the following manner. Package 1 for each example was weighed and was added into a container in the sequence listed. Each container was sealed until the time of application. Prior to spray application, each package's crosslinking component or package 2 was added by weight to its corresponding package 1 and was dispersed evenly by shaking the re-sealed container.

Each of the coating compositions of Examples 1 to 4 was spray applied over a substrate prepared as follows. Each panel (APR24711 from Advanced Coating Technologies Inc., Hillsdale, Mich.) was sanded first with 360 grit sandpaper and then re-sanded with 600 grit sandpaper (360 Wetordry Tri-M-ite paper and P600 213Q Imperial Wetordry Production paper available from 3M, St. Paul, Minn.). Each sanded panel was then primed with DP 40/DP 401 (primer-sealer available from PPG Industries, Inc.), prediluted with DT 870 solvent package, and dried and cured for 1 hr. Each panel was then coated with DBC 3824, a base coat available from PPG Industries, Inc., prediluted with DT 870. After the base coat dried for 30 minutes, each of the example coatings was applied to a test panel.

After 1 week dry and cure each coating composition was tested for gloss, distinction of image, solvent resistance, and adhesion; at this time a cut section of each panel was exposed to humidity for an additional 96 hr. period.

The results of each of the performance tests for Example 1 to 4 are set forth in the Table below.

| EXAMPLE COATING | 20 DEGREE GLOSS[1] 1 DAY | 20 DEGREE GLOSS[1] 1 WK. | DOI[2] 1 DAY | DOI[2] 1 WK. | ADHESION[3] 1 WK. | TOLUENE RESIST.[4] 1 WK. | HUMIDITY[5] 96 HRS. IMMED. OUT | | HUMIDITY[5] 96 HRS. 24 HR. RECOV. | |
|---|---|---|---|---|---|---|---|---|---|---|
| 1 | 94 | 94 | 65 | 65 | 5 | SWELL; RING W/ DEFORM. SL LEACH | GLOSS DOI ADH. BLIST. | 93 60 5 10 | GLOSS DOI ADH. | 92 65+ 5 |
| 2 | 30 | 28 | 0 | 0 | 1,2 BRITTLE | RING | GLOSS DOI ADH. BLIST. BRITTLE | 25 0 0,1 10 | GLOSS DOI ADH. BLIST. | 24 0 0,1 BRITTLE |
| 3 | SOFT | 90 | SOFT | 50 | 5 | TOO SOFT FOR EVAL. | GLOSS DOI ADH. BLIST. BLUSH | 77 <10 5 10, | GLOSS DOI ADH. BLIST. | 83 45 4 NO BLUSH |
| 4 | 91 | 91 | 60 | 60 | 5 | SLIGHTLY SOFTENED, ETCHED THE FILM | GLOSS ADH. BLIST. | 87 4 10 | GLOSS | 92 5 |
| COMMERCIAL CONTROL[6] | 90 | 90 | 70– | 65 | 5 | NO EFFECT | GLOSS DOI ADH. BLIST. SL. SOAKIN | 89 60– 5 10 | GLOSS DOI ADH. SOAKIN DEFORM. GONE | 89 65+ 5 |

[1]20 Degree gloss was measured with a BYK Gardner Glossgard IIa gloss meter. Higher numbers indicate greater gloss.
[2]DOI was measured with a "C-Box", Glow Box Model GB11-8 with image of Landolt rings from Instruments for Research and Industry of Cheltenham, PA. Higher numbers indicate better clarity.
[3]Adhesion was measured by the standards set forth in ASTM D 359-95a.
[4]Solvent resistance was determined by allowing toluene drops to completely evaporate from the surface of each example coating and then visually observing for surface defects.
[5]Humidity exposure was performed in accordance to ASTM D 1735-92. Blistering was visually rated on a scale of 1 to 10, where 1 indicates complete failure and 10 indicates no blistering.
[6]A polyisocyanate-cured clear coat available from PPG Industries, Inc. as DCU2119.

The data in the Table indicate that the film-forming compositions of Examples 1, 3, and 4 exhibit adhesion and humidity resistance comparable to a commercial clear coat cured with polyisocyanate. The softness of the composition of Example 3 is due to the lack of catalysts in the composition. Note that film-forming compositions of the present invention containing polyisocyanate as a curing agent are also preferably cured at elevated temperatures.

Note also that although the composition of Example 2 is very brittle, cure is evidenced by toluene resistance.

We claim:

1. An imine functional addition copolymer containing a plurality of groups of the structure:

wherein A is

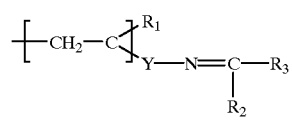

$R_1$ is hydrogen or methyl, $R_2$ is hydrogen or an alkyl group having from about 1 to about 10 carbon atoms; $R_3$ is an alkyl or aryl group having from about 1 to about 10 carbon atoms, or $R_3$ is bonded to $R_2$ and forms part of a five- or six-membered ring; Y is a divalent linking group having from about 3 to about 15 carbon atoms; B is the residue of at least one ethylenically unsaturated monomer selected from the group consisting of styrene, butyl acrylate, butyl methacrylate, alpha-methyl styrene, isobornyl methacrylate, and hydroxyethyl acrylate, copolymerized with A; x is about 10 to about 50 percent by weight; and m is about 50 to about 90 percent by weight; based on the total solid weight of monomers used to prepare the copolymer.

2. The addition copolymer of claim 1 wherein Y has the structure:

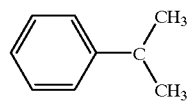

and $R_2$ is hydrogen.

3. The addition copolymer of claim 1 wherein Y has the structure:

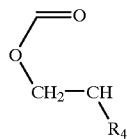

and R₄ is hydrogen or an alkyl group having from about 1 to about 10 carbon atoms.

4. An imine functional addition copolymer prepared by reacting together the following:
  1) an ethylenically unsaturated material having the structure:

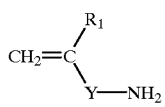

wherein R₁ is hydrogen or methyl and Y is a divalent linking group having about 3 to about 15 carbon atoms;
  2) at least one other copolymerizable ethylenically unsaturated monomer different from 1); and
  3) an aldehyde or ketone.

5. The addition copolymer of claim 4 wherein Y has the structure:

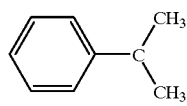

and component 3) is an aldehyde.

6. The addition copolymer of claim 4 wherein Y has the structure:

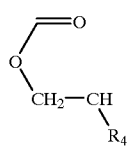

and R₄ is hydrogen or an alkyl group having from about 1 to about 10 carbon atoms.

7. The addition copolymer of claim 4 wherein 3) is selected from the group consisting of isobutyraldehyde, acetaldehyde, benzaldehyde, trimethylacetaldehyde, methylethyl ketone, diisopropyl ketone, methylisobutyl ketone, acetone, and mixtures thereof.

8. The addition copolymer of claim 4 wherein the ethylenically unsaturated material of 1) is reacted with the aldehyde or ketone of 3) to form an aldimine- or ketimine-functional monomer, prior to polymerization with the copolymerizable ethylenically unsaturated monomer of 2).

9. The addition copolymer of claim 8 wherein the aldimine- or ketimine-functional monomer is present in the copolymer in an amount of about 10 to about 50 percent by weight based on the total solid weight of monomers used to prepare the copolymer.

10. The addition copolymer of claim 8 wherein the aldimine- or ketimine-functional monomer is present in the copolymer in an amount of about 20 to about 40 percent by weight based on the total solid weight of monomers used to prepare the copolymer.

11. A curable film-forming composition comprising (a) an imine functional addition copolymer containing a plurality of groups of the structure:

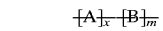

wherein A is

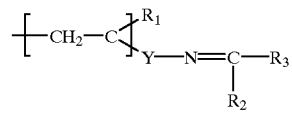

R₁ is hydrogen or methyl; R₂ is hydrogen or an alkyl group having from about 1 to about 10 carbon atoms; R₃ is an alkyl or aryl group having from about 1 to about 10 carbon atoms, or R₃ is bonded to R₂ and forms part of a five- or six-membered ring; Y is a divalent liking group having from about 3 to about 15 carbon atoms; B is the residue of at least one ethylenically unsaturated monomer selected from the group consisting of styrene, butyl acrylate, butyl methacrylate, alpha-methyl styrene, isobornyl methacrylate, and hydroxyethylacrylate, copolymerized with A; x is about 10 to about 50 percent by weight; and m is about 50 to about 90 percent by weight; based on the total solid weight of monomers used to prepare the copolymer; and (b) a curing agent having functional groups that are reactive with imine groups.

12. The curable film-forming composition of claim 11, wherein the curing agent is selected from the group consisting of polyisocyanates, polyanhydrides, polycarbonates, polyepoxides, polyacrylates, and mixtures thereof.

13. The curable film-forming composition of claim 11, wherein Y has the structure:

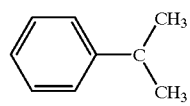

and R₂ is hydrogen.

14. The curable film-forming composition of claim 11 wherein Y has the structure:

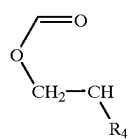

and R₄ is hydrogen or an alkyl group having from about 1 to about 10 carbon atoms.

15. A curable film-forming composition comprising:
  a) an imine functional addition copolymer prepared by reacting together the following ingredients:
    1) an ethylenically unsaturated material having the structure:

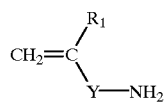

wherein $R_1$ is hydrogen or methyl and Y is a divalent linking group having about 3 to about 15 carbon atoms;
2) at least one other copolymerizable ethylenically unsaturated monomer different from 1); and
3) an aldehyde or ketone; and b) a curing agent having functional groups that are reactive with imine groups.

16. The curable film-forming composition of claim 15, wherein the aldehyde or ketone of 3) is selected from the group consisting of isobutyraldehyde, acetaldehyde, benzaldehyde, trimethylacetaldehyde, methylethyl ketone, diisopropyl ketone, methylisobutyl ketone, acetone, and mixtures thereof.

17. The curable film-forming composition of claim 11, wherein said film-forming composition is solventborne.

18. The curable film-forming composition of claim 11, wherein component (a) is present in the curable film-forming composition in an amount of about 30 to about 90 percent by weight, based on the total weight of resin solids in the film-forming composition.

19. The curable film-forming composition of claim 11, wherein component (b) is present in the curable film-forming composition in an amount of about 10 to about 70 percent by weight, based on the total weight of resin solids in the film-forming composition.

20. The curable film-forming composition of claim 11, wherein said film-forming composition is a two-package composition.

21. The curable film-forming composition of claim 11, wherein said film-forming composition is curable at ambient temperature.

22. The curable film-forming composition of claim 11, wherein the curing agent of component (b) is a polyisocyanate.

23. The curable film-forming composition of claim 11, wherein said film-forming composition is a one-package composition.

* * * * *